United States Patent [19]

Stiles et al.

[11] Patent Number: 5,188,981
[45] Date of Patent: Feb. 23, 1993

[54] MOLDED ARTICLE WITH INTEGRAL HEAT SHIELD

[75] Inventors: Ernest D. Stiles, St. Clair Shores; Ronald K. Wlosinski, Sterling Heights; Daniel Q. Houston, Dearborn, all of Mich.

[73] Assignee: Ford Motor Company, Dearborn, Mich.

[21] Appl. No.: 706,605

[22] Filed: May 28, 1991

[51] Int. Cl.⁵ .............................. B32B 9/00
[52] U.S. Cl. .................... 428/195; 428/357; 428/446; 428/913
[58] Field of Search .............. 428/913, 195, 209, 446, 428/210, 90, 35.7

[56] References Cited

U.S. PATENT DOCUMENTS

| | | | |
|---|---|---|---|
| 3,654,062 | 4/1972 | Loew | 428/164 |
| 3,943,676 | 3/1976 | Ickes | 52/309.12 |
| 4,005,234 | 1/1977 | Stroupe | 428/209 |
| 4,188,463 | 2/1980 | Acuri, Jr. | 429/104 |
| 4,201,829 | 5/1980 | Mast et al. | 428/332 |
| 4,225,109 | 9/1980 | Yotsutsuji et al. | 428/332 |
| 4,426,061 | 1/1984 | Taggart | 249/45 |
| 4,655,473 | 4/1987 | Muller et al. | 280/610 |
| 4,810,559 | 3/1989 | Fortier et al. | 428/161 |
| 4,841,702 | 6/1989 | Huettemann | 52/309.12 |
| 4,849,147 | 7/1989 | Freeman | 264/257 |

Primary Examiner—Patrick J. Ryan
Assistant Examiner—William Krynski
Attorney, Agent, or Firm—Damian Porcari; Clifford L. Sadler

[57] ABSTRACT

A molded article comprising a molded body and one or more llayers of heat shielding material attached to the molded body and a method of making same. The heat shielding material is placed on localized areas of the molded articles which are exposed to elevated temperatures. The molded article may be a fiber reinforced plastic (FRP) which comprises a fibrous material containing a resin or alternatively, the molded article may be a thermoplastic material with or without reinforcement.

4 Claims, 4 Drawing Sheets

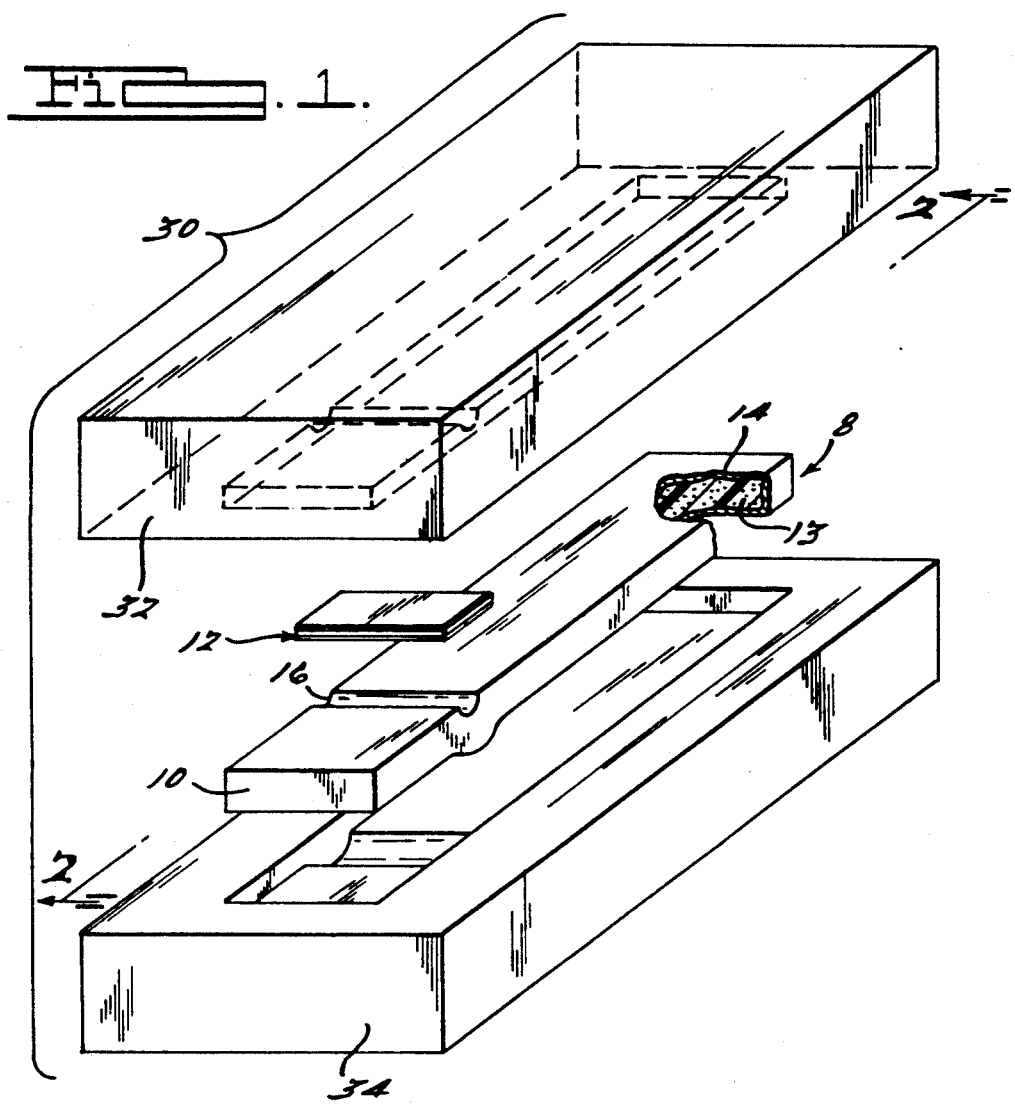
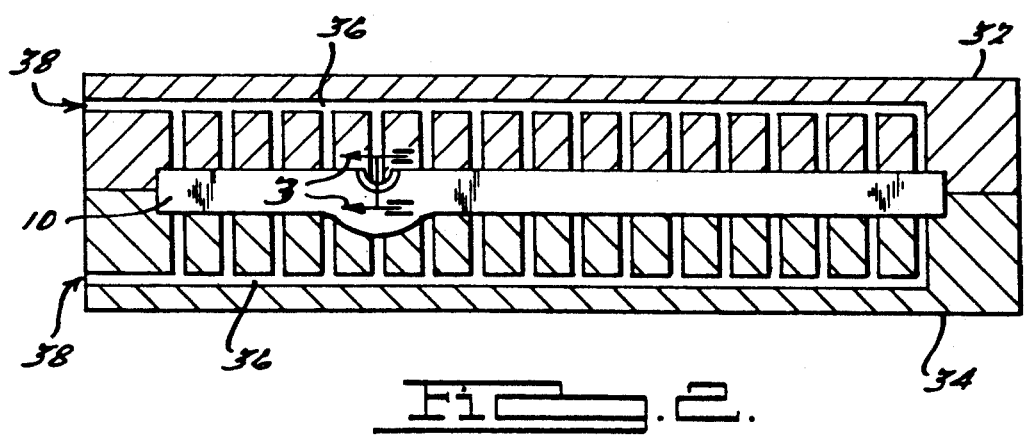

MOLDED ARTICLE WITH INTEGRAL HEAT SHIELD

FIELD OF THE INVENTION

This invention relates to a molded article having an integral heat shield and a method of making the same.

BACKGROUND OF THE INVENTION

Molded articles are useful in a variety of applications. Molded articles include both thermoset composite and thermoplastic material. Thermoset composite materials are made by combining a fiber reinforcement with a liquid resin. The resin wets the fiber reinforcement material and then cures. Thermoplastic material is thermoformable and may be injection molded or blow-molded to form articles having very complex shapes. Blow-molding is especially useful for manufacturing articles for holding fluids such as containers.

Both types of molded articles are generally sensitive to exposure at elevated temperatures. Thermoplastic and thermoset composite articles tend to soften when exposed to temperatures above their melting point. Thermoset composite articles tend to oxidize the resin portion of the composite material. In both cases, the molded article becomes structurally weakened by the exposure to elevated temperatures. When localized areas are exposed to elevated temperature, these localized areas tend to weaken.

A variety of methods have been used to protect a molded article from exposure to high temperatures. Various types of heat shields have been affixed either to the elevated temperature source or the molded article. These heat shielding devices include various layers of perforated metal sheets containing spaces or baffles to insulate the molded article from high temperatures. Problems with add-on heat shields of this type include the added bulk and cost of incorporating add-on heat shields to molded articles. In some applications, the weight saved between a molded article and a steel article has been more than made up by the requirement for add-on heat shields.

Another method of protecting molded articles from elevated temperatures is the use of high temperature resistant resins and thermoplastic materials. These new materials may permit molded articles to withstand elevated temperatures without need of add-on heat shields. The disadvantage of these new high temperature resistant materials is they are not capable of withstanding very high temperatures in excess of 1000° F. Their cost and the difficulty in processing these materials do not make them commercially feasible in large production situations.

In many applications, the exposure of the molded article to elevated temperature is localized. Manufacturing an entire molded article with these high temperature resistant materials is unnecessary. It is one object of the present invention to provide an integral heat shield for protecting localized areas of molded articles from elevated temperatures. It is a further object of the present invention to provide a low cost method of fabricating a molded article with an integral heat shield. It is a further object of the present invention to provide a lightweight molded article having and integral heat shield to protect localized areas from elevated temperatures.

SUMMARY

The present invention relates to a molded article comprising a preformed body and one or more layers of heat shielding material attached to the preform body. The heat shielding material is placed on localized areas of the molded article which are exposed to elevated temperatures. The molded article may be a fiber reinforced plastic (FRP) which comprises a fibrous material containing a resin or alternatively, the molded article may be a thermoplastic material with or without reinforcement.

The invention also provides a method of making a FRP molded article having an integrally molded heat shield comprising the steps of providing a preform, placing one or more layers of heat shielding material adjacent to the preform and injecting resin in the preform to form a molded article. A thermoformable article having an integrally molded heat shield may be made by the steps of providing a thermoformable article, placing one or more layers of heat shielding material adjacent the preform and attaching a heat shielding material to the preform.

The heat shielding material may comprise one or more layers of heat insulating material and/or one or more layers of heat reflecting material. Various types of heat insulating material made from ceramic fiber and silicone foam material can be used in the present invention. Of the ceramic materials useful in the present invention, preferred are those made of silica. The ceramic fiber material may be made in a woven, braided, wound, chopped, looped, or structurally engineered fashion. The foam material may be made with either open or closed celled as will be described in more detail. The fiber and open cell foam material is porous and permits resin to wet the material. The closed cell or very tightly woven material is non-porous and does not permit resin to significantly wet the insulation material. Wetting as used herein is the impregnation of resin within a material.

Resin wets the porous insulation material as well as the fibrous material. The insulating material may be used alone or in combination with a heat reflecting material. The heat reflecting material is generally an infrared reflecting material such as a metal foil. The heat reflecting material may be partially foraminous to assist in adhering to the molded article. The heat reflecting material may be used with or without insulating material. The heat reflecting material acts to reflect heat away from the molded article whereas the heat insulating material acts to reduce the amount of heat which reaches the molded article.

Both the insulating and reflecting material act to shield the molded article from the damaging effects of elevated temperatures. The invention integrates the heat shield within the molded article to insure the heat shield is correctly positioned and to protect the heat shield from being damaged or removed. Integrating the heat shield within the molded article also reduces manufacturing and assembly costs as well as the bulk and weight of article and heat shield.

It is an advantage of the present invention to provide a light weight integrally molded heat shield made with relatively low cost material to protect localized areas from elevated temperatures. It is another advantage of the present invention to provide a method of manufacturing a molded article having an integrally molded heat shield.

These and other objects, advantages and features of the present inventions will become apparent to one of ordinary skill in the art upon reference to the following detailed description and drawings.

BRIEF DESCRIPTION OF THE DRAWINGS

FIG. 1 shows an exploded view of a preform and heat shield in a mold.

FIG. 2 shows a sectional view along the line II—II in FIG. 1 with the mold in the closed position.

FIGS. 6-9 diagrammatically show the manufacture of a blow-molded article incorporating an integrated heat shield.

DETAILED DESCRIPTION OF THE DRAWINGS

Figure 3:
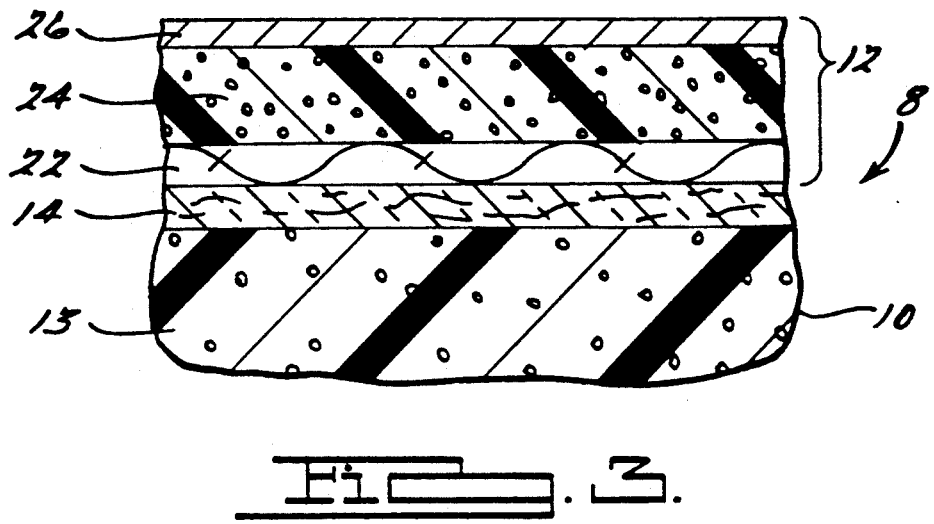
FIG. 3 is a detail cross-sectional view along the line III—III in FIG. 2 showing the final molded article removed from the mold.

FIGS. 1-3 show the manufacture of an integrally molded heat shield on a thermoset composite crossmember 8 for an automobile. A preform 10 generally conforming to the desired shape of the crossmember is placed in a mold. Preform 10 may be made by a variety of conventional methods. It may contain a foam core, blow-molded core, metal reinforced core, or maybe a hollow. Shown in FIG. 1 is preform 10 having a foam core 13 surrounded by fibrous mat 14. Foam core 13 and fibrous mat 14 may be made from a wide variety of materials which are well known in the FRP art. Specifically preferred for foam core 13 are closed cell urethane materials. Fibrous mat 14 maybe fibrous material having a continuous strand or directional fiber placement.

Preform 10 is made generally in the shape of the final molded article and has a localized area 16 for receiving a heat shielding material. Localized area 16 may be dish-shaped to receive the heat shielding material. Providing a dish-shape to localized area 16, permits the finished crossmember 8 to have a smooth exterior finish. If a smooth exterior finish is not required, localized area 16 may be flush with the surface of preform 10 so that the heat shield extends above the surface of the crossmember 8.

Heat shield 12 is attached to preform 10 adjacent localized area 16. Heat shield 12 may be attached to preform 10 by a variety of method including adhesive, compression fit, fasteners, and sewing. Heat shield 12 may optionally be attached to preform 10 in the molding process described below. In this case, heat shield 12 is placed in a mold and preform 10 is placed adjacent heat shield 12 so that localized area 16 registers with heat shield 12.

Heat shield 12 may comprise a heat insulating material and/or a heat reflecting material. Shown in FIG. 3 is heat shield 12 comprising two layers of heat insulating material 22,24 and a layer of heat reflecting material 26. Heat insulating material 22 is of porous construction such as a fibrous or open-cell insulating material. Shown is insulating material 22 made of a silica woven insulating material of the type manufactured under the name Thermotec Exobloc TM by Bisco Products. The Thermotec product combines the porous and non-porous insulating materials into one integral product. Both materials are also available alone and in combination with other materials. Other types of suitable porous insulating materials are commercial available such as silicone foam materials from General Electric, and COHlastic TM silicone foam from CHR Industries. A wetting agent may be added to insulating material 22, to aid in wetting insulating material 22 with resin.

A layer of non-porous insulating material 24 is attached to insulating material 22. Non-porous insulating material 24 is designed to prevent a liquid resin from passing therethrough. A variety of commercially available products exist which are useful for non-porous material 22. Of the commercially available products, those manufactured using a silicone foam are preferred. Shown in FIG. 3 is a silicone closed-cell foam insulating material 24, manufactured under the name Thermotec Exobloc TM by Bisco Company. A variety of commercially available heat insulating materials combining the woven and closed-cell construction are commercially available. As stated, the Thermotec product combines both the porous material 22 and non-porous material 24 into one product. A wet-out agent may be added to insulating material 24 to prevent the wetting of insulating material 24 by resin.

Woven ceramic fibers offer a very high temperature protection between 1000°-2000° F. Silicone foam products can be used for temperature between 400°-700° F. The woven and foam products can be combined in one or more layers as is necessary to protect the molded article from temperature damage.

Heat reflecting material 26 is attached to insulating material 24. Reflecting material 26 may be a metal or metalized foil which is capable of reflecting heat. Suitable materials infrared reflecting materials include aluminum or copper foil having a thickness of between 1-2 mils.

Reflecting material 26 may be affixed to insulating material 22 prior to molding. Alternatively, reflecting material 26 may be placed atop insulating material 22 and adhered directly thereto by the molding process. Various layers of insulating and reflecting materials may be combined to provide the heat shielding required for a particular application. It is preferable that the outer layer of crossmember 8 be made of a heat reflecting material to most efficiently reflect infrared heat radiating on the molded article and to help protect the insulating materials beneath from damage.

Crossmember 8 is manufactured by a liquid molding process as is well known in the FRP art. Preform 10 and heat shield 12 are placed in a liquid resin injection molding tool 30. Tool 30 comprises first and second die piece 32,34. Die pieces 32,34 have resin channels 36 which communicate a source of pressurized resin (not shown) with the surface of preform 10. Die pieces 32,34 are closed and closely follow the surface of preform 10. Liquid resin 38 is injected through resin channels 36. Resin 38 wets fibrous mat 14. Resin 38 also wets porous insulting material 22. Non-porous insulting material 24 and heat reflecting material 26 are impermeable to liquid resin. Resin 38 does not wet heat shield 12 beyond insulting material 22. Resin 38 is allowed to cure. Once cured, tool 30 is opened and finished crossmember 8 is removed.

Figure 4:
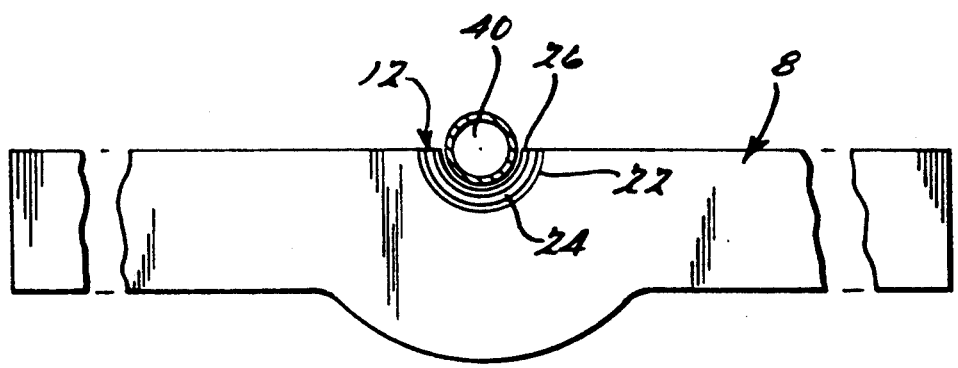
FIG. 4 is an edge view of a finished molded article placed adjacent a heat source.
Figure 5:
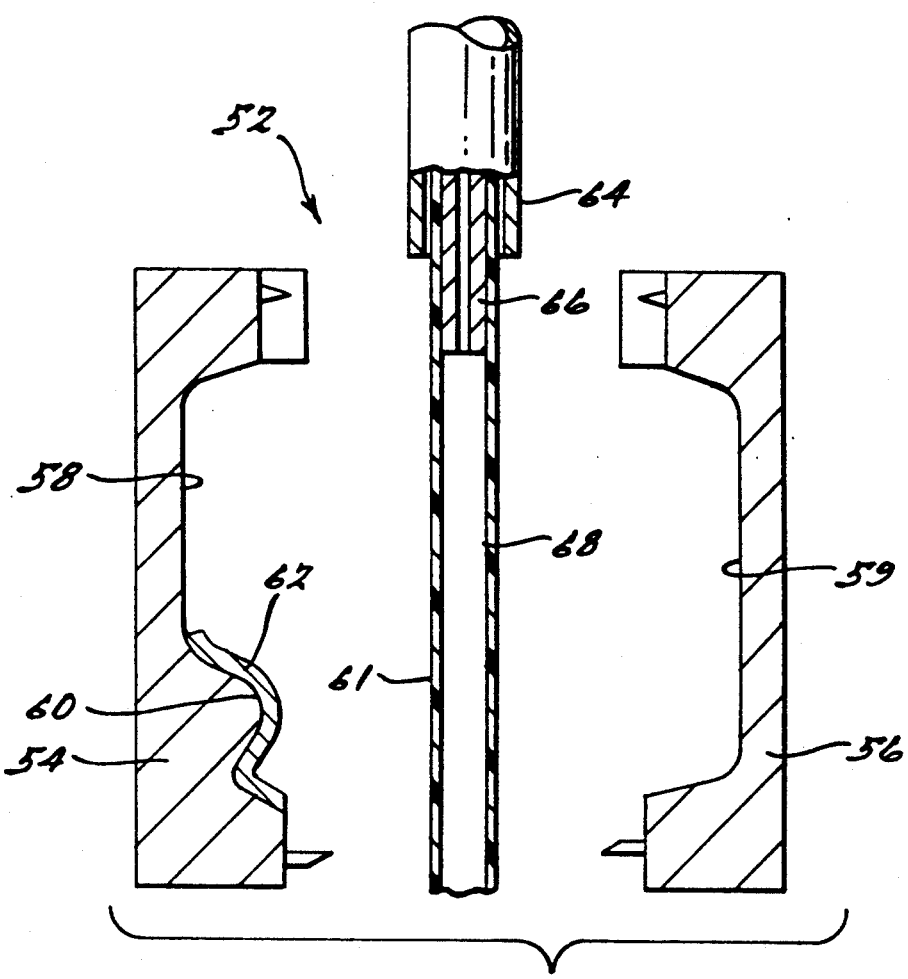
Figure 6:
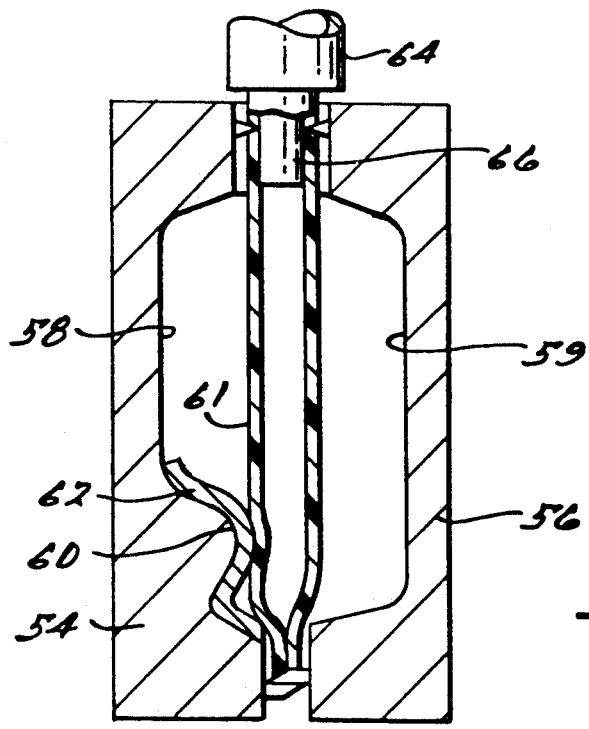

FIG. 4 shows crossmember 8 installed adjacent an exhaust pipe 40. Heat shield 12 is located in the immediate vicinity of exhaust pipe 40 and protects crossmember 8 from the damaging affects of exposure to high temperatures.

As exhaust pipe 40 warms, heat shield 12 is heated by radiant and convection heating. Reflecting material 26 acts to reflect heat back toward exhaust pipe 40. Heat which is not reflected by reflecting material 26 passes through to non-porous insulating material 24. Insulating material 24 reduces the amount of heat which is transferred to porous insulating material 22. Insulating material 22 acts both as an insulating material and as an attaching mechanism between heat shield 12 and preform 10. Heat shield 12 is designed such that the temperature within insulating material 22 remains well below the glass transition temperature ($T_g$) of the resin. Slight oxidation of the resin within material 22 is permissible without degrading the mechanical properties of preform 10. The combined reflecting and insulating properties of insulating materials 22,24 and reflecting material 26 prevent the transmission of heat to preform 10 sufficient to oxidize or degrade the resin therein.

The invention as described teaches three layers of heat shielding material: a heat reflecting film nearest the heat source, a non-porous insulating material, and a porous material farthest from the heat source. The invention may be practiced with one or any combination of these heat shielding materials and in any arrangement. While not wishing to be bound by the following theory, it is believed that placing the heat reflecting material nearest the heat source produces the largest amount of heat reflection. The non-porous insulating material 24, produces the greatest resistance to thermal damage. Placing non-porous material 24 between reflecting material 26 and porous material 22 is an efficient means of producing a relatively large resistance to thermal transfer in a small space. Because insulating material 22 includes some resin 38, it is desirable to maintain the temperature in this layer well below the $T_\lambda$ of the resin. Placing insulating material 22 farthest from the heat source protects resin 38 from damage and maintains the integrity of the heat shield/preform bond.

The invention has been described using a combination of woven and closed-cell insulating material. Other configurations of insulating material are possible and are within the scope of the present invention. An open-cell insulating material (one having an open-cell structure which permits internal passages within the insulating material to communicate resin throughout the material) may be used in place of a woven insulating material. A closed-cell insulating material may also be used as a heat shield. A closed-cell material can rely on the adhesive properties of the resin to adhere the heat shield directly to the preform.

It is believed that completely impregnating the insulating material with resin reduces the thermal insulating properties of an insulating material. Therefore, when maximum heat shielding is desired, a barrier between the resin and the heat insulating material should be maintained.

The heat reflecting material has been shown overlying the heat insulating material. It is possible to overlay the heat reflecting material directly on the preform. As the resin wets the preform, it also wets the interior surface of the heat reflecting material and adhesively bonds the heat reflecting material directly to the preform. When relatively low heat shielding is required for a molded article, the heat reflecting material may be bonded directly to the preform without any insulating material therebetween. Because the heat reflecting material is relatively thin, in the order of 2 mils, this embodiment may be useful for protecting existing molded articles from high temperatures without modifying their tooling.

Integrally molded heat shields may also be useful with thermoformable plastic materials. A method and apparatus for producing a thermoformable article having and integral heat shield is illustrated in FIGS. 6-9. A female molding tool 52 having die pieces 54,56 is used for blow-molding fuel tank 50. Die piece 54 has an interior wall surface 58 conforming to the exterior shape of a molded fuel tank 50. Mold piece 54 has a projection 60. Projection 60 registers with localized area 61 of fuel tank 50 which will be exposed to elevated temperatures. Die piece 56 has an interior wall surface 59. Interior wall surfaces 58,59 shape the exterior surface of molded fuel tank 50. Mold tool 52 is operable to open and close die pieces 54,56. Mold 52 is shown in the open position in FIG. 6.

Intermediate die pieces 54,56 is extruder 64 and mandrel 66. Extruder 64 extrudes a hollow tubularly shaped parison 68 for blow-molding. Mandrel 66 is preferably located within extruder 64 and supplies pressurized gas used in the blow-molding process. Extruder 64 and mandrel 66 are the type commonly used for blow-molding.

Heat shield 62 is placed to overlie interior wall surface 58 in the region of projection 60. Heat shield 62 may be retained on projection 60 by pins or adhesive or alternatively, heat shield 62 may be formed in a shape which registers with projection 60 and retained thereon by a press fit. Heat shield 62 may be manufactured as described in the embodiments illustrated in FIGS. 1-5. Heat shield 62 may contain a combination of heat reflecting and heat insulating materials. Heat shield 62 may contain insulating material having open and closed cells, woven or braided construction or other surface configurations as previously described and may containing heat reflecting material as previously described. Heat shield 62 is preferably constructed to have a porous or partially porous surface facing the thermoformable article. This porous surface permits the thermoformable material to partially impregnate itself within heat shield 62.

Figure 7:
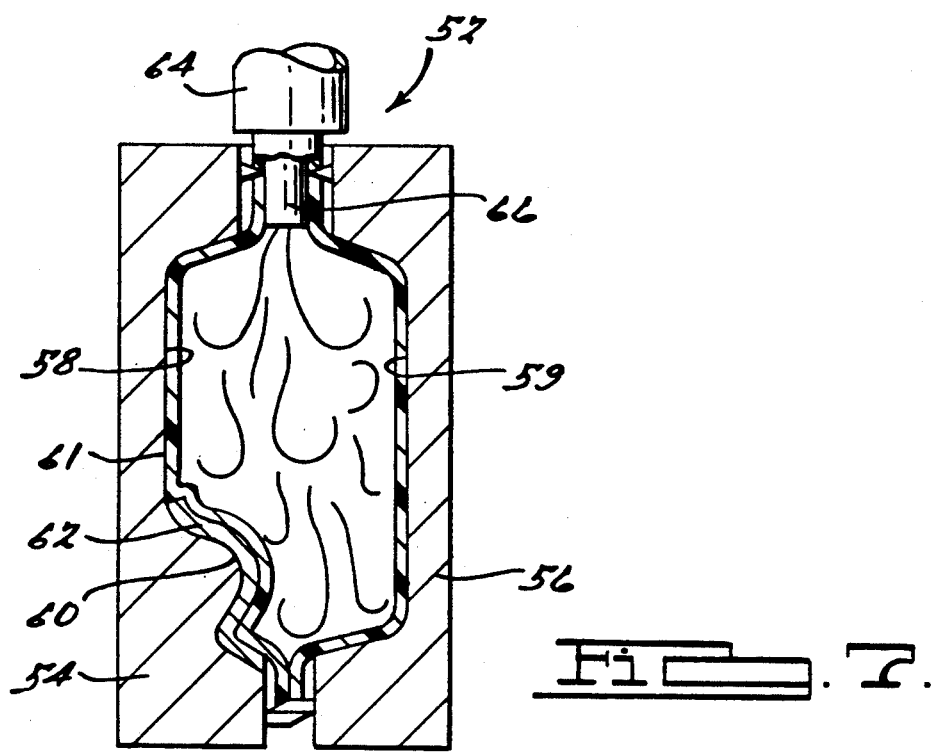
Figure 8:
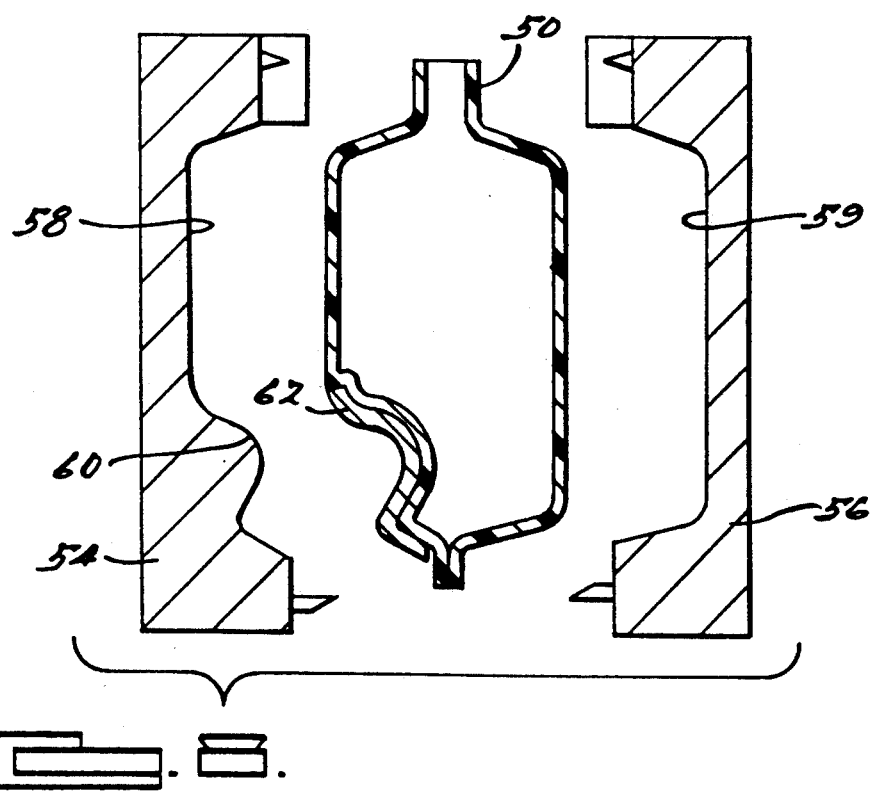

Extruder 64 extrudes a tubular parison 68 of thermoformable material. Many materials are known for use in blow-molding but especially preferred are materials containing primarily polypropylene or polyethylene. A length of parison 68 sufficient to completely fill the length of mold 52 is extruded. Parison 68 is sealed at the bottom portion by closing mold 52 as shown in FIG. 7. Closing mold 52 causes die pieces 54 and 56 to move toward one another, pinching the bottom of parison 68 closed. Blow-molding mandrel 66 supplies pressurized gas to parison 68 as shown in FIG. 8. Parison 68 inflates and is forced against heat shield 62. Parison 68 partially permeates the surface of heat shield 62 to form and integral structure.

Parison 68 is allowed to cool and mold tool 52 is opened to remove finished blow-molded fuel tank 50. Located in a localized area 61 is heat shield 62. Localized area 61 is intended to be exposed to elevated temperatures such as those included near an exhaust pipe in the underbody of an automobile.

The invention as described permits the location of a blow-molded fuel tank adjacent a high temperature exhaust system without add-on heat shields or heat deflectors. Heat shield 62 acts to reflect heat away from fuel tank 50 and insulate thermoformable material from exposure to elevated temperatures.

The invention as described is suitable for use with thermoset composite as well as thermoformable molded articles. Heat shielding material is integrally molded in localized areas which are intended to be exposed to elevated temperatures. Integrally molding a heat shield within a localized area saves space and weight compared to attaching an external heat shield.

The invention has been described in terms of a crossmember and a blow-molded fuel tank. However, the method and article of the present invention may be adapted to form other molded articles for both automotive and non-automotive applications. It is understood that various modifications of the preferred embodiments can be used. For example, the teachings of this inventions are applicable for the manufacture of fluid containing vessels and structural components. It is understood by those skilled the art in view of the present disclosure that various changes and modifications may be made without departing from the scope of the invention. Claims appended hereto are intended to cover all such changes and modifications.

We claim:

1. A molded article comprising:
   a molded body; and
   one or more layers of heat shielding material attached to said molded body, said heat shielding material placed on localized area of said molded article exposed to elevated temperatures, said molded body at least partially impregnating said heat shielding material whereby said heat shielding material is integrally molded within said body.

2. An automotive structural member comprising:
   a fibrous preform;
   a heat shielding material having a resin impregnable insulating material placed adjacent said fibrous preform, said heat shielding material located on localized areas of said member exposed to elevated temperatures; and
   resin impregnating said fibrous preform and said insulating material whereby said insulating material is integrally molded within said member.

3. The member of claim 2, wherein said insulating material is made from silica.

4. The member of claim 2, said heat shielding material further comprises a heat reflecting material made from a metal foil.

* * * * *